United States Patent
Nijdam et al.

(10) Patent No.: US 10,655,661 B2
(45) Date of Patent: May 19, 2020

(54) CONNECTOR FOR CONNECTING PROFILED-SECTION ELEMENTS

(71) Applicant: J. van Walraven Holding B.V., Mijdrecht (NL)

(72) Inventors: Frank Nijdam, Zeewolde (NL); Robert Van Der Mik, Tienhoven (NL)

(73) Assignee: J. VAN WALRAVEN HOLDING B.V., Mijdrecht (NL)

( * ) Notice: Subject to any disclaimer, the term of this patent is extended or adjusted under 35 U.S.C. 154(b) by 134 days.

(21) Appl. No.: 15/311,353

(22) PCT Filed: May 22, 2015

(86) PCT No.: PCT/NL2015/050371
§ 371 (c)(1),
(2) Date: Nov. 15, 2016

(87) PCT Pub. No.: WO2015/187008
PCT Pub. Date: Dec. 10, 2015

(65) Prior Publication Data
US 2017/0074305 A1 Mar. 16, 2017

(30) Foreign Application Priority Data
Jun. 3, 2014 (NL) .................................... 2012933

(51) Int. Cl.
*F16B 7/00* (2006.01)
*F16B 7/04* (2006.01)
(Continued)

(52) U.S. Cl.
CPC ............ *F16B 7/0413* (2013.01); *F16B 7/182* (2013.01); *F16B 37/045* (2013.01)

(58) Field of Classification Search
CPC .............. Y10T 403/55; Y10T 403/557; Y10T 403/5793; Y10T 403/7041; E04G 7/20;
(Continued)

(56) References Cited

U.S. PATENT DOCUMENTS 3,031,217 A * 4/1962 Tinnerman ........... A47B 57/565
403/187
3,222,095 A * 12/1965 Gerus .................... A47B 91/02
16/DIG. 39

(Continued)

FOREIGN PATENT DOCUMENTS

DE 9401420 U1 3/1995
EP 0841492 A1 5/1998

*Primary Examiner* — Matthew R McMahon
(74) *Attorney, Agent, or Firm* — Hoffmann & Baron, LLP

(57) ABSTRACT

A connector, for connecting two profiled-section elements of the channel type having a bottom and an upper side formed by flanges defining between them a longitudinal slot, includes an elongate connector body designed to be inserted partially into each of the profiled-section elements to be connected from the respective longitudinal ends thereof, where the connector body is at least provided with two bores. The connector includes at least two screws, the screws having a shank having a tip on one end and a head on another end, where the shanks of the respective screws extend through the respective bores. The connector body includes a connector plate with upstanding edge portions on either lateral side thereof, the upstanding edge portions having a top edge remote from the connector plate 3, the top edges, in use, facing the flanges of the profiled-section element.

3 Claims, 2 Drawing Sheets

(51) Int. Cl.
*F16B 7/18* (2006.01)
*F16B 37/04* (2006.01)

(58) Field of Classification Search
CPC ........ F16B 7/0413; F16B 7/182; F16B 7/187; F16B 2012/403; F16B 37/045; F16B 7/0473
USPC ............... 256/65.15; 403/292, 297, 314, 363
See application file for complete search history.

(56) References Cited

U.S. PATENT DOCUMENTS

| | | | | | |
|---|---|---|---|---|---|
| 3,489,392 | A | * | 1/1970 | Thom | E04F 11/181 256/65.08 |
| 3,606,408 | A | * | 9/1971 | Wagner | E04F 11/1817 403/297 |
| 3,900,269 | A | * | 8/1975 | Pavlot | F16B 7/0413 403/292 |
| 4,104,000 | A | * | 8/1978 | Fleischmann | E04F 11/1812 403/7 |
| 4,249,830 | A | * | 2/1981 | Day | F16B 7/0446 403/246 |
| 4,377,915 | A | * | 3/1983 | Zossimas | A47G 1/102 40/785 |
| 4,417,373 | A | * | 11/1983 | Keglewitsch | H01R 9/2616 24/458 |
| 4,657,426 | A | * | 4/1987 | Targetti | F16B 7/0413 403/295 |
| 4,694,598 | A | * | 9/1987 | Eisenloeffel | A47G 1/102 40/785 |
| 4,859,109 | A | * | 8/1989 | Targetti | F16B 7/0413 403/297 |
| 4,929,114 | A | * | 5/1990 | Young | E04B 1/5831 403/172 |
| 5,138,759 | A | * | 8/1992 | Gruetzmacher | B23Q 9/0042 269/47 |
| 5,799,430 | A | * | 9/1998 | Fremstad | A47G 1/10 40/782 |
| 5,988,930 | A | * | 11/1999 | Liebetrau | F16B 37/045 403/279 |
| 6,305,671 | B1 | * | 10/2001 | Valentine | E04H 17/1443 256/65.13 |
| 6,722,810 | B1 | * | 4/2004 | Tachikawa | F16B 7/0413 403/109.1 |
| 8,235,623 | B2 | * | 8/2012 | Wagner | E04F 11/1836 403/297 |
| 9,366,022 | B2 | * | 6/2016 | Frey | E04B 1/5831 |
| 9,638,229 | B2 | * | 5/2017 | Gamain | F16B 9/023 |
| 9,858,835 | B2 | * | 1/2018 | Wicken | G09F 7/18 |
| 2002/0023391 | A1 | * | 2/2002 | Nymark | E04B 2/7453 52/36.4 |
| 2013/0121760 | A1 | * | 5/2013 | Chen | F16B 7/0473 403/362 |

* cited by examiner

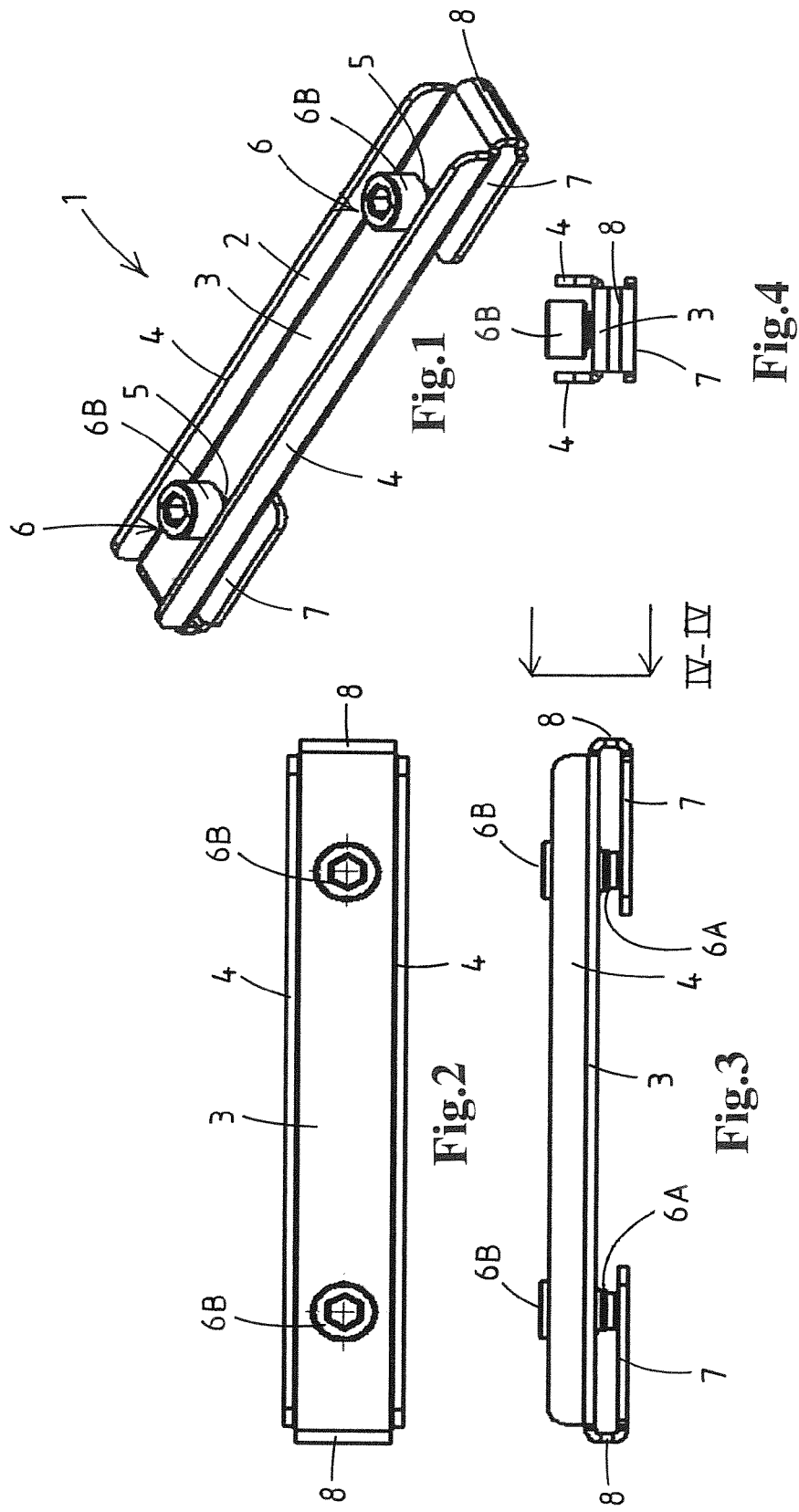

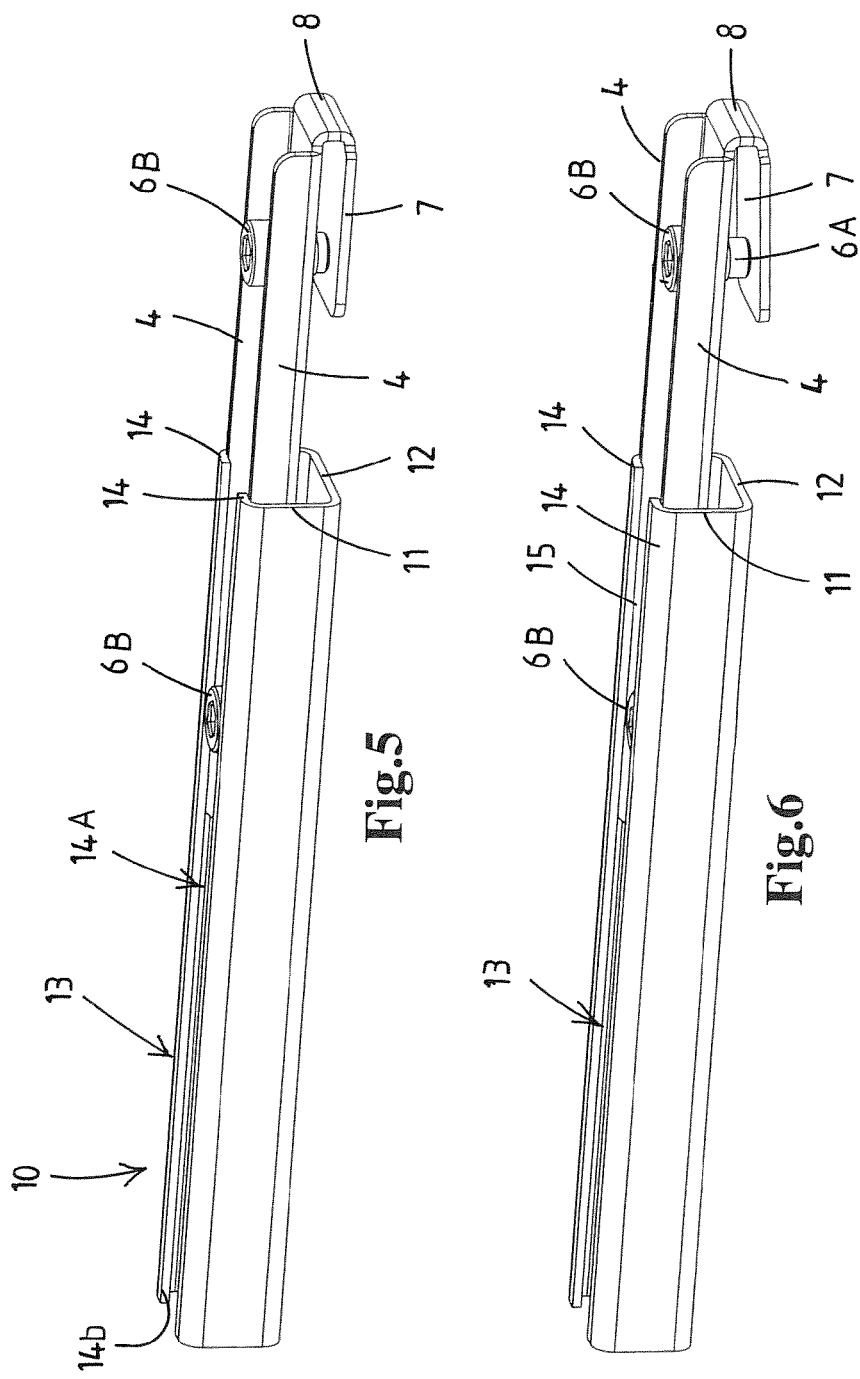

CONNECTOR FOR CONNECTING PROFILED-SECTION ELEMENTS

CROSS-REFERENCE TO RELATED APPLICATIONS

This application is the National Stage of International Application No. PCT/NL2015/050371 filed May 22, 2015, which claims the benefit of Netherlands Application No. NL 2012933, filed Jun. 3, 2014, the contents of which is incorporated by reference herein.

FIELD OF THE INVENTION

The present invention relates to a connector for connecting two profiled-section elements of the type having lateral walls extending in a longitudinal direction, a bottom connecting the lateral walls, and an upper side formed by flanges extending inwardly from the respective lateral walls, said flanges defining between them a longitudinal slot, and said flanges having an inner side facing the bottom and an outer side facing away from the bottom. The connector comprises an elongate connector body designed to be inserted partially into each of the profiled-section elements to be connected from the respective longitudinal ends thereof, wherein the connector body is at least provided with two bores. The connector furthermore comprises at least two screws, said screws having a shank having a tip on one end and a head on another end, wherein the shanks of the respective screws extend through the respective bores.

BACKGROUND OF THE INVENTION

EP 0 841 492 A1 discloses a connector which comprises a groove strip with threaded holes, an apertured strap with through holes and screws. The connector is used to interconnect two profile members. The groove strip is received in mounting grooves of the profile members. The mounting grooves have flanges. The strap rests on the outer side of the flanges. By tightening the screws, the groove strip and the strap are drawn together and tightened against the flanges.

A drawback of the known connector is that the aperture strap and the screw head are located outside the contour of the profiled-section elements which limits the accessibility for mounting other structural elements to the profiled-section element.

The present invention has for an object to overcome the mentioned drawback.

SUMMARY OF THE INVENTION

This object is achieved by a connector for connecting two profiled-section elements of the type having lateral walls extending in a longitudinal direction, a bottom connecting the lateral walls, and an upper side formed by flanges extending inwardly from the respective lateral walls, said flanges defining between them a longitudinal slot, and said flanges having an inner side facing the bottom and an outer side facing away from the bottom. The connector comprises an elongate connector body designed to be inserted partially into each of the profiled-section elements to be connected from the respective longitudinal ends thereof, wherein the connector body is at least provided with two bores. Furthermore the connector comprises at least two screws, said screws having a shank having a tip on one end and a head on another end, wherein the shanks of the respective screws extend through the respective bores. The connector body comprises a connector plate with upstanding edge portions on either lateral side thereof, said upstanding edge portions having a top edge remote from the connector plate, said top edges, in use, facing the inner side of the flanges of the profiled-section element. In the connector plate said at least two bores are provided through which the shanks of said screws extend, wherein the head of the screw in an initial state is spaced apart from the connector plate and is located between the upstanding edge portions, and wherein the screw shank can be advanced through the bore whereby the spacing between the connector plate and the screw head is reduced. The screw shanks have a length which is such that when the tip thereof is supported by the bottom of the profiled-section element, the top edges of the upstanding edge portions can be brought in clamping engagement with the inner side of the flanges of the profiled-section element by advancing the screws through the bores. Preferably the bores are threaded bores and the shanks are provided with a male thread.

According to the invention the connector is thus secured to the profiled-section element by clamping it between the bottom and the flanges of the profiled-section element inside the profiled-section element, whereas in the prior art the flanges of the profiled-section element are clamped between two members that are tightened together by screws. Contrary to the known connector, the connector according to the invention does not have two elements that are tightened together by screws, but comprises only one connector body which resides within the profiled-section and is pushed against the inner side of the flanges by advancing the screws through the bores. Consequently, the invention does not require a counter element on the outside of the profiled-section element to secure the connector with respect to the profiled-section element.

Furthermore the connector according to the invention comprises less parts than the known connector.

In an advantageous embodiment the respective heads of the screws are located in the mounted state between the flanges of the respective profiled-section elements, and the heads of the screws do not extend beyond the upper side of the profiled-section element. Thereby no parts extend beyond the outer contours of the profiled-section element.

In a possible embodiment the connector body is formed generally as a U-shaped profiled-section member. Such a profiled-section member can be easily manufactured in large amounts out of metal strip, and provides a one-piece part.

In a further embodiment the connector has a tongue attached to the connector body, said tongue being spaced apart from the connector plate on a side opposite the side where the screw heads are located, said tongue extending in the longitudinal direction of the connector plate, said tongue in use being in engagement with the bottom of the profiled-section element, and wherein a tip of the shank of the screw abuts the tongue such that when the shank of the screw is advanced through the bore, the tongue is tilted to an oblique position with respect to the connector plate.

Preferably a tongue is provided at each end of the connector plate. More in particular the tongue may be an extension of the connector plate which is folded over at the longitudinal end of the connector plate such that the tongue extends spaced apart from and essentially parallel to the bottom.

The tongue provides a sliding surface when the connector body is inserted in the end portion of the profiled-section element, which is advantageous because it prevents that the screw shank tip is caught by irregularities or openings in the bottom of the profiled-section element, which would hamper the installation of the connector.

Furthermore the tongue provides a tilting lever for lifting of the connector body with respect to the bottom of the profiled-section element. It provides a larger and thus more stable engagement interface between the connector and the bottom of the profiled-section element, than when for example only a screw tip would engage said bottom.

The invention also relates to an assembly comprising two channel shaped profiled-section elements and a connector as described in the above, wherein the connector body is inserted in an end section of either of the channel shaped profiled-section elements, such that the top edges of the respective upstanding edge portions are facing the inner side of the flanges of the profiled-section element, and wherein the tips of the shanks of the screws are supported by the bottom of the profiled-section element, and the shanks have been advanced through the bores, such the top edges of the upstanding edge portions have been brought in clamping engagement with the inner side of the flanges of the profiled-section element, wherein, preferably, the respective heads of the screws are located between the flanges of the respective profiled-section elements, and wherein the heads of the screws do not extend beyond the upper side of the profiled-section element.

The invention furthermore relates to a method for connecting two profiled-section elements using a connector as described in the above.

The invention will be elucidated in the following detailed description with reference to the drawings.

BRIEF DESCRIPTION OF THE DRAWINGS

FIG. 1 shows a view in perspective of a preferred embodiment of a connector according to the invention, FIG. 2 shows a top elevational view of the connector of FIG. 1, FIG. 3 shows a side elevational view of the connector of FIG. 1, FIG. 4 shows a view according to line IV-IV in FIG. 3, FIG. 5 shows a view in perspective of the connector of FIG. 1 inserted in an end portion of a profiled-section element, and FIG. 6 shows the connector of FIG. 5 in a clamping state.

DETAILED DESCRIPTION OF THE INVENTION

In FIG. 1 is shown a connector 1 comprising a connector body 2 having an elongate shape. The connector body 2 is preferably formed from metal strip material.

The connector body 2 comprises a connector plate 3 and upstanding edge portions 4 on either lateral side of the connector plate 3. In the shown embodiment the edge portions are formed as upstanding wall portions that extend perpendicular with respect to the connection plate, as can be seen in FIG. 4. The connector thus generally has a U-shaped cross section. It is conceivable that the edge portions extend under another angle than a right angle with respect to the connector plate 3, or that the edge portions are not formed as a wall portion, but as a series of lugs.

In the shown embodiment the connector plate 3 has two bores 5 formed in them. In some embodiments the number of bores can be greater, for example four or six. The bores 5 are preferably provided with an inner thread.

The connector 1 also includes two screws 6 which have a shank 6A and a head 6B. The shank 6A is provided with a male thread that can cooperate with the thread in the bores 5. The shank 6A has a tip at an end opposite the end where the head 6B is located. In the specific embodiment shown the screw head 6B is formed as a socket head screw such that it can be tightened by a socket head wrench or other suitable tool. However, also other commonly known screw head shapes are possible.

The head 6B is located on the side of the connector plate 3 where the upstanding edge portions 4 are located. The head 6B thus is located between the upstanding edge portions 4, as can be clearly seen in FIGS. 1 and 4. In an initial pre-mounting state the top surface of the head 6B may extend beyond the top edge of the edge portions 4 as can be seen clearly in FIGS. 3 and 4. As can be seen in FIG. 4, in that initial state the underside of the head 6B is spaced apart from the connector plate 3.

The connector body 2 is provided at longitudinal ends thereof with tongues 7. In the shown embodiment the tongues 7 are formed as a folded over extension of the connector plate 3. In this embodiment the tongues 7 are thus an integral part of the connector body 3 which is monolithically formed with the remainder of the connector body 2. The bend portion 8 functions as a hinge as will be described below. It is conceivable that the tongues 7 are connected to the connector body in another way than is shown here.

In an initial pre-mounting state the tongues 7 extend substantially parallel to the connector plate 3 as can be clearly seen in FIG. 3. The end face of the screw shank 6A abuts the tongue as is visible in FIG. 3. In that case there is still some space between the head 6B and the connector plate 3 as is shown in FIG. 4.

The connector is designed to interconnect profiled-section elements of the "channel" type. In FIG. 5 such a profiled-section element 10 is shown. Often these are referred to also as C-shaped profiled-section elements. Profiled-section elements of his type have lateral walls 11 extending in a longitudinal direction, a bottom 12 connecting the lateral walls 11, and an upper side 13 formed by flanges 14 extending inwardly from the respective lateral walls 11, said flanges 14 defining between them a longitudinal slot 15, and said flanges 14 having an inner side 14A facing the bottom 12 and an outer side 14B facing away from the bottom 12.

In FIG. 5 is shown how the connector 1 is inserted in the open longitudinal end of the profiled-section element of this type. The tongue 7 provides a sliding surface that slides over the bottom 12 of the profiled-section element 10. This makes mounting of the connector 1 more easy, because, especially if the bottom 12 is provided with mounting holes, the screw shanks 6A might otherwise get caught by the bottom mounting holes which impedes a smooth insertion of the connector 1 in the profiled-section element 10.

When the connector body 2 is inserted in the profiled-section element 10 it can be secured thereto by advancing the screw shank 6A through the threaded hole 5. Thereby the distance between the screw head 6B and the connector plate 3 is decreased. Furthermore the tip of the shank 6A forces the tongue 7 away from the connector plate 3, whereby the tongue 7 will tilt with the bend portion 8 functioning as a hinge, as is shown in FIG. 6 on the right side. Thus, the distance between a free end region of the tongue 7 and the connector plate 3 is increased. Because the tongue rests on the bottom 12 of a profiled-section element (in FIGS. 5 and 6 the second profiled-section element has been omitted in the drawing for the sake of clarity), the connector plate and the upstanding edge portions 4 are raised with respect to the bottom 12, until the upper edges of the respective edge portions 4 are in abutment with the inner side 14B of the flanges 14. By tightening the screw further, the connector 1 is secured to the profiled-section element 10 by clamping it inside of the profiled-section element between the bottom 12 and the flanges 14 of the profiled-section element 10. The dimensions of the screw 6 are such that when the screw is in the tightened position, the screw head 6B does not extend beyond the upper side of the flanges 14 of the profiled-section element 10 as is shown in FIG. 6.

When both halves of the connector body 2 are secured to the respective profiled-section elements 10, these profiled-section elements 10 are interconnected with each other.

It should be noted that in the shown embodiment the screw shank tips are supported by the bottom of the profiled-section elements via the tongues 8. It is however also conceivable to make an embodiment where the tongues are omitted and where the screw shank tip engages the bottom directly. It is also conceivable to provide the screw tip in the latter configuration with a sliding foot, for example made of plastic.

The invention claimed is:

1. A connector for connecting two profiled-section elements of the type having lateral walls extending in a longitudinal direction, respective longitudinal ends, a bottom connecting the lateral walls, and an upper side formed by flanges extending inwardly from the respective lateral walls, said flanges defining between them a longitudinal slot, and said flanges having an inner side facing the bottom and an outer side facing away from the bottom, the connector being formed in one piece out of metal strip and comprising:

an elongate connector body formed as a U-shaped profiled-section member having a bottom plate and upstanding lateral plates on either lateral side thereof, said upstanding lateral plates having a top edge remote from the bottom plate, the bottom plate being provided with at least two bores, wherein the connector furthermore has an extension monolithically formed at either longitudinal end of the bottom plate, said extension comprising a bend portion, which is folded over at a longitudinal end of the bottom plate, and a tongue, such that the tongue extends spaced apart from and parallel to the bottom plate, said tongue in use being in engagement with the bottom of a respective one of the two profiled-section elements, wherein the upstanding lateral plates have inner surfaces facing each other and defining an inner width of the U-shaped profiled-section member, and have outer surfaces defining an outer width of the U-shaped profiled-section member, wherein the bend portion has a width corresponding to said inner width and the tongue has a width corresponding to said outer width, and at least two screws, said screws having a shank having a tip on one end and a head on another end, wherein the shanks of the respective screws extend through the respective bores and the screw head in an initial state is spaced apart from the bottom plate and is located between the upstanding lateral plates of the connector body, and wherein the screw shank can be advanced through the bore whereby the spacing between the bottom plate and the screw head is reduced, and wherein the tip of the shank of the screw abuts the tongue such that when the shank of the screw is advanced through the respective bore, the tongue is tilted to an oblique position with respect to the bottom plate, whereby the bottom plate and lateral plates of the connector body are lifted and the edges of the upstanding lateral plates can be brought in clamping engagement with the inner side of the flanges of the respective profiled-section element.

2. The connector according to claim 1, wherein the bottom plate is located in a middle between the top edge of the upstanding lateral plates and the surface of the tongue facing away from the bottom plate.

3. The connector according to claim 1, wherein in a pre-mounting state, in which the tongue is parallel to the bottom plate and in which the tip of the screw shank touches the tongue, a top surface of the screw head extends beyond the top edge of the upstanding lateral plates.

* * * * *